(12) United States Patent
Andrews

(10) Patent No.: US 9,169,635 B2
(45) Date of Patent: Oct. 27, 2015

(54) APPARATUS TO TIE FORMS TO EXISTING STRUCTURES

(71) Applicant: Ronald Andrews, Decatur, IN (US)

(72) Inventor: Ronald Andrews, Decatur, IN (US)

( * ) Notice: Subject to any disclaimer, the term of this patent is extended or adjusted under 35 U.S.C. 154(b) by 0 days.

(21) Appl. No.: 14/015,114

(22) Filed: Aug. 30, 2013

(65) Prior Publication Data

US 2014/0059968 A1 Mar. 6, 2014

Related U.S. Application Data

(60) Provisional application No. 61/694,819, filed on Aug. 30, 2012.

(51) Int. Cl.
*E04B 1/38* (2006.01)
*E04B 1/41* (2006.01)
*E04G 17/00* (2006.01)
*F16B 13/06* (2006.01)

(52) U.S. Cl.
CPC .............. *E04B 1/4157* (2013.01); *E04G 17/00* (2013.01); *F16B 13/065* (2013.01); *F16B 13/066* (2013.01)

(58) Field of Classification Search
CPC ....... E04B 1/40; E04B 1/4157; E04B 1/4178; E04C 5/125; F16B 13/06
USPC ............... 52/698, 699; 411/57.1, 58, 61, 221, 411/325, 401
See application file for complete search history.

(56) References Cited

U.S. PATENT DOCUMENTS

| | | | | | |
|---|---|---|---|---|---|
| 185,633 | A | * | 12/1876 | Enochs | .......................... 411/325 |
| 3,964,230 | A | * | 6/1976 | Fischer | ........................... 52/698 |
| 4,194,717 | A | | 3/1980 | Easton et al. | |
| 5,212,920 | A | * | 5/1993 | Tye | ................................ 52/127.1 |
| 5,897,300 | A | | 4/1999 | Luedtke | |
| 6,325,581 | B1 | | 12/2001 | Abell | |
| 6,457,922 | B1 | * | 10/2002 | Tsai | ................................ 411/55 |
| 7,131,808 | B2 | | 11/2006 | Brewka | |
| 2008/0073480 | A1 | | 3/2008 | Lesmeister et al. | |
| 2011/0150590 | A1 | | 6/2011 | Buchner | |

* cited by examiner

*Primary Examiner* — Patrick Maestri

(57) ABSTRACT

An apparatus to tie concrete or masonry forms to existing concrete, block, or masonry structures, comprising an elongate, generally cylindrical bar. Said bar comprises, at one end, a means for anchoring the apparatus into an existing structure, at the other end, a means for coupling said apparatus to a form, and, connecting the ends to each other, a shank.

10 Claims, 3 Drawing Sheets

APPARATUS TO TIE FORMS TO EXISTING STRUCTURES

CROSS-REFERENCES TO RELATED APPLICATIONS

This Application claims the benefit of priority to Application No. 61/694,819, filed Aug. 30, 2012, which is incorporated fully herein.

STATEMENT REGARDING FEDERALLY SPONSORED RESEARCH OR DEVELOPMENT

Not applicable

BACKGROUND

Poured concrete walls have been used in structures for many years, particularly to form the exterior walls of residential basements. It is well known to the art to use ties to support the forms in which the concrete forming such walls is initially poured. A typical concrete wall form system consists of a series of panels configured to face each other, creating a void adapted to "form" wet concrete into a wall of desired length, width, and height. The materials used for forms have evolved over time, and can include wood, sheet metal, foams, or plastics. Ties are used to secure opposing form panels to each other to support the form structure while the concrete is drying. Using an adequate number of ties of sufficient strength is important, since the weight of wet concrete creates a significant outward force against the form panels. Ties, when used properly, keep the form panels in position and prevent the form panels from bowing or separating during the pouring, setting, and curing of concrete.

Ties known to the art are inserted at regular intervals through each form panel prior to the pouring of concrete. Such ties are fastened on each side of opposing form panels, and, thus fastened, apply inward tension to prevent the form panels from parting or bowing during the pour. Such ties ran through the void formed by the space between opposing form panels, into which concrete will be poured. During the pour, the ties become surrounded on all sides by concrete. As the concrete sets and cures, the ties become part of the concrete structure. After the form panels are removed, the ends of the ties protrude from the concrete wall, and are typically broken off or cut.

Problems arise, however, when it is desirable to tie a concrete form panel to an existing concrete wall, as is often required during a remodeling or addition project. Ties known to the art are designed to fasten form panels to each other, and then to become part of a concrete wall after it is poured. Ties known to the art are not designed, nor are they adaptable, to fasten a form panel to an existing concrete wall. Attempting to use ties known to the art in this application can result a number of undesirable results, including an undesired gap between an existing concrete wall and a concrete wall intended to be poured adjacent to it.

SUMMARY

The present invention is directed to a novel apparatus that satisfies the need for a tie adapted to tie a form to an existing concrete or masonry wall. The apparatus comprises a generally cylindrical bar, wherein one end of the bar is configured to anchor into existing concrete, and the opposite end is configured to tie directly to a concrete form panel or to couple to a conventional tie already secured to a concrete form panel.

In the Summary above and in the Description, and the claims below, and in the accompanying drawings, reference is made to particular features of the invention. It is to be understood that the disclosure of the invention in this specification includes all possible combinations of such particular features.

BRIEF DESCRIPTION OF THE DRAWINGS

These and other features, aspects, and advantages of the present invention will become better understood with regard to the following description and accompanying drawings, where.

DESCRIPTION

The versions of the present invention consist of apparatuses adapted to tie forms to existing stone, concrete, or masonry structures. The apparatus of versions of the present invention is particularly useful for tying forms to existing block, masonry, or concrete basement walls, as is often required in building addition or remodeling projects.

Apparatuses according to versions of the present invention can be made of any material, provided the apparatus has sufficient strength and rigidity to hold a form substantially in place during concrete pouring, setting, and curing. Appropriate materials will be readily recognized by those skilled in the art, and include specifically steel, galvanized steel, bronze, and other metals.

An apparatus according to versions of this invention consists of an elongate bar of substantially circular cross-section throughout its length. The bar comprises at one end a means for coupling the apparatus to existing, concrete or masonry [1], at the opposite end a means for coupling the apparatus to a form [3], and a shank [5] connecting the end comprising the concrete or masonry coupling means [1] with the end comprising the form coupling means [3].

The concrete or masonry coupling means [1], which will for convenience be referred to herein as the "concrete coupling means," comprises a structure serving as a concrete or masonry anchor [7]. The concrete coupling means can comprise one of a variety of anchor structures adapted to couple to concrete or masonry, including at least one of a sleeve anchor structure, a strike anchor structure, a drop-in anchor structure, a machine screw anchor structure, a leadwood screw anchor structure, a single expansion anchor structure, a double expansion anchor structure, a lag shield anchor structure, a nail-it anchor structure, a hammer drive anchor structure, a split drive anchor structure, and a tapcon screw anchor structure. Virtually any anchor structure that is now known or becomes known in the future to couple a tie, bolt, or anchor to concrete, cement, or masonry can be used as a concrete coupling means within the scope of this invention, as will be readily apparent to one skilled in the art.

Figure 1:
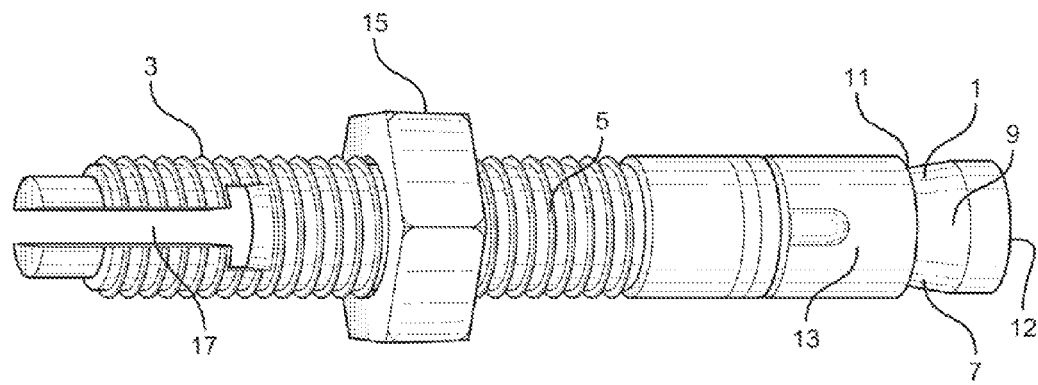
FIG. 1 shows an apparatus according to a version of the invention adapted to couple to the head of a round tie secured to a form.
Figure 2:
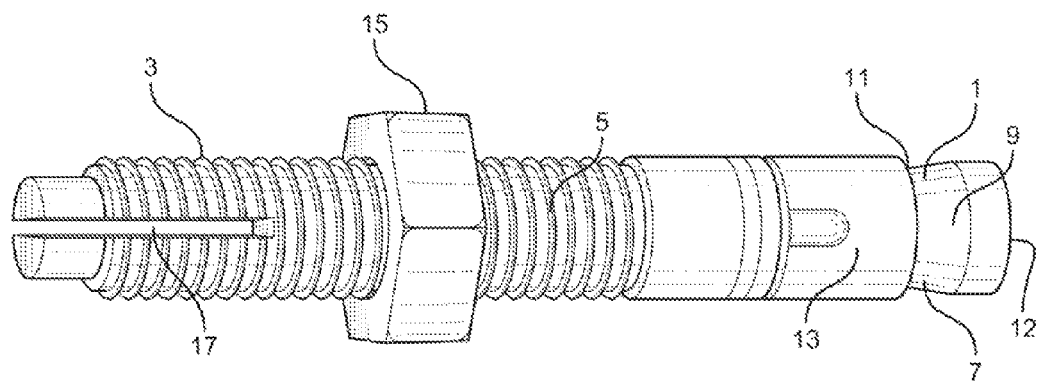
FIG. 2 shows an apparatus according to a version of the invention adapted to couple to the head of a flat tie secured to a form.
Figure 3:
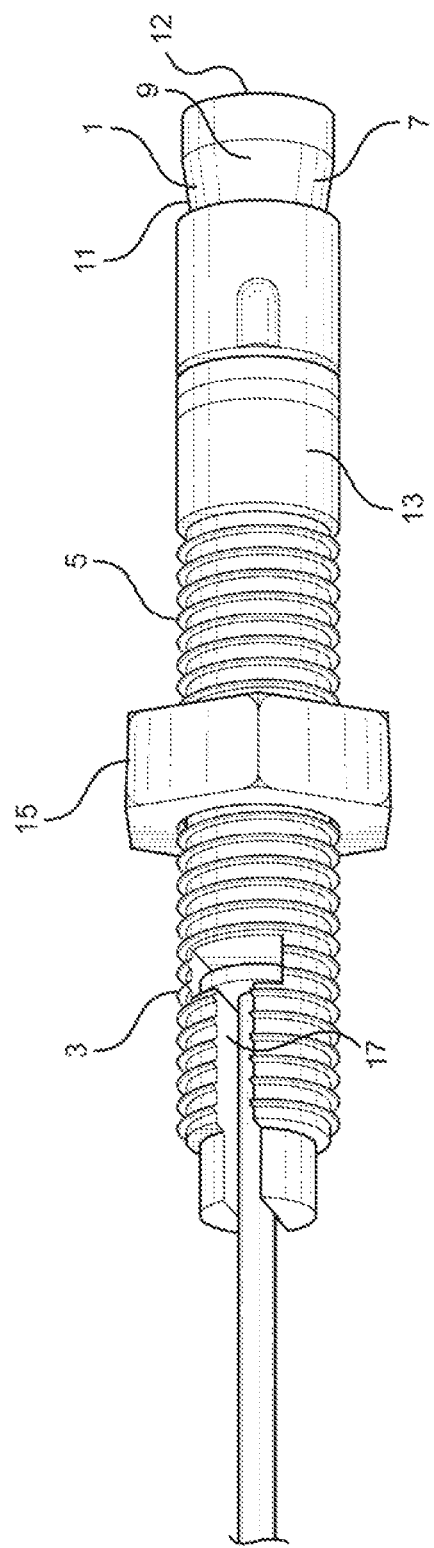
FIG. 3 shows an apparatus according to a version of the invention coupled to the head of a round tie.
Figure 4:
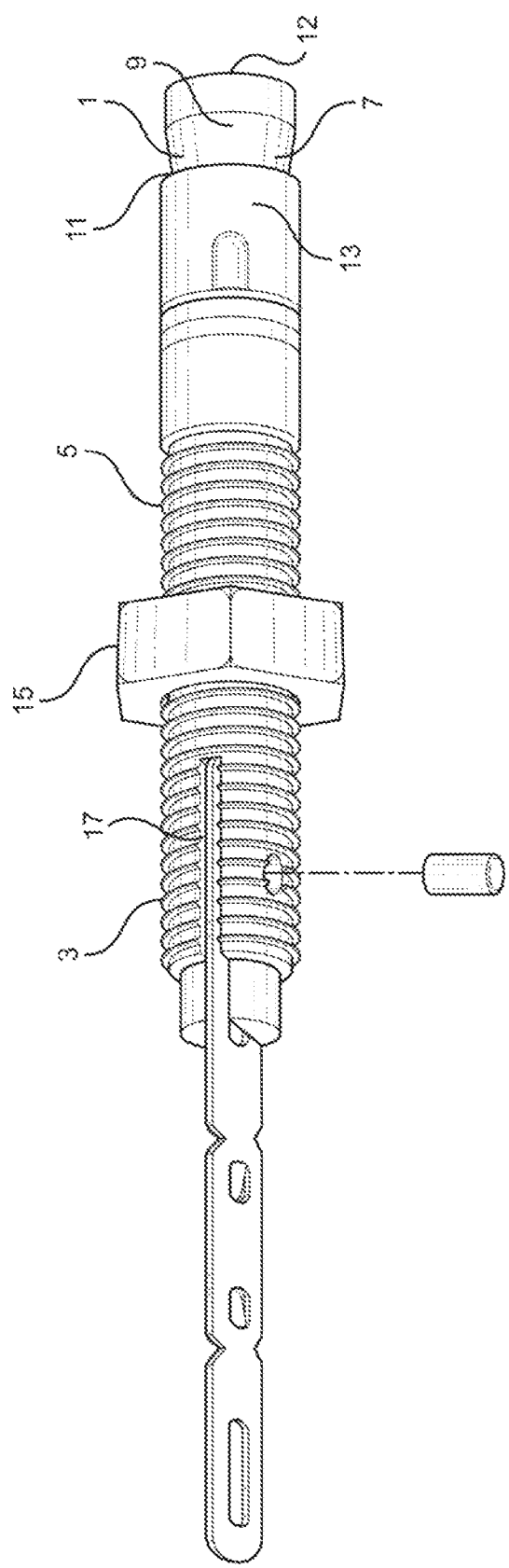
FIG. 4 shows an apparatus according to a version of the invention coupled to the head of a flat tie.

Preferably, the concrete coupling means [1] comprises of a wedge anchor structure, as shown in FIGS. 1 and 2. A wedge anchor structure according to the versions of this invention comprises a conical member [9] whose narrowest portion

[11] connects to, and is substantially the same diameter as, the shank [5]. The widest portion [12] of the conical member [9] has a diameter larger than the diameter of the shank [5]. A collar [13] surrounds the circumference of the apparatus in substantially the area of the junction of the shank [5] and narrowest portion [11] of the conical member [9]. In this version of the invention, the concrete coupling means [1] is placed into a pre-bored hole in existing concrete. Pressure is applied to the apparatus axially in line with the shank, such as by striking the end of the apparatus opposite the concrete coupling means [1] with a hammer. Such pressure causes the conical member [9] to expand, forcing the collar [13] to expand until the collar [13] is pressed against the inner circumference of the hole pre-bored into the concrete, thus anchoring the apparatus in the concrete.

The shank [5] of the apparatus in one version of the invention is smooth. Preferably, the shank [5] is partially threaded and adapted to receive one or more nuts [15], as shown in FIGS. 1 and 2. In these embodiments of the invention, once the concrete coupling means [1] has been anchored into existing concrete, said nuts [15] can be tightened against the existing concrete to stabilize the apparatus against the surface of the concrete.

The form coupling means [3] comprises a protrusion adapted to extend through a hole in a concrete form panel. In certain embodiments of the invention, the form coupling means [3] may optionally further include one or more holes adapted to receive one or more pins to hold the form in place. Optionally, the form coupling means [3] can comprise a hook for coupling directly to a hole or aperture in a form.

In a preferred embodiment, as shown in FIGS. 1 and 2, the form coupling means [3] comprises a structure for coupling the apparatus to a separate tie secured to the form. In these versions of the invention, the form coupling means [3] comprises an aperture [17] cut through the apparatus in a shape adapted to receive and couple to the head of a conventional wall tie, which wall tie is coupled to a form panel. Preferably, the aperture [17] is in a shape adapted to receive the head of a flat tie, as shown in FIG. 1, or a shape adapted to receive the head of a round tie, as shown in FIG. 2. Optionally, the form coupling means [3] can further comprise a hole through the form coupling means traverse to the aperture, adapted to receive a pin, which pin can then pass through a compatible hole in an existing wall tie to stabilize and secure the interface between the form coupling means [3] and the existing wall tie.

Although the present invention has been described in considerable detail with reference to certain preferred versions thereof, other versions are possible. For example, materials, lengths, anchor structures, or aperture shapes, may be used for an apparatus according to versions of this invention other than those described in detail herein. While the apparatus is described for use in connection with concrete forms, forms for cement, plaster, or other materials may be used. The apparatus is described with reference to form "panels," however, any form shape or geometry can be used with the invention described herein. Therefore, the spirit and scope of the claims should not be limited to the description of the preferred versions described herein.

What is claimed is:

1. An apparatus adapted to tie a form to an existing masonry or concrete structure, said apparatus comprising an elongate bar of generally circular cross-section throughout its length, wherein one end of said bar comprises a means for anchoring the apparatus to an existing masonry or concrete structure and the opposite end of said bar comprises a means for securing said apparatus to a form, wherein said means for securing said apparatus to a form comprises an aperture shaped to receive at least a portion of a tie, and wherein said means for securing said apparatus to a form further comprises a through-hole through transverse to said aperture and a pin cooperating with said through-hole to secure said tie within said aperture.

2. An apparatus adapted to tie a form to an existing masonry or concrete structure, said apparatus comprising an elongate bar of generally circular cross-section throughout its length, wherein one end of said bar comprises a means for anchoring the apparatus to an existing masonry or concrete structure and the opposite end of said bar comprises a means for securing said apparatus to a form, wherein said means for securing said apparatus to a form comprises at least one through-hole through said elongate bar, wherein said through-hole receives at least one pin, and wherein said pin secures a tie to said means for securing said apparatus to a form.

3. An apparatus for securing a form to an existing concrete or masonry structure, said apparatus comprising an anchor portion, a form retainer portion, and a shank portion connecting said anchor portion to said form retainer portion, wherein said form retainer portion comprises an aperture shaped to receive at least a portion of a tie and wherein said form retainer portion farther comprises a through-hole transverse to said aperture and a pin cooperating with said through-hole to secure said tie within said aperture.

4. The apparatus of claim 1, wherein at least a portion of said elongate bar is threaded.

5. The apparatus of claim 1, wherein said means for anchoring the apparatus into an existing concrete masonry or concrete structure comprises at least one or a wedge anchor; a sleeve anchor; a strike anchor; a drop-in anchor; a machine screw anchor; a leadwood screw anchor; a single expansion anchor; a double expansion anchor; a lag shield anchor; a hammer drive anchor; a split drive anchor, and a threaded screw anchor.

6. The apparatus of claim 5, wherein said aperture is shaped to receive a portion of at least one of a flat tie and a round tie.

7. The apparatus of claim 2, wherein at least a portion of said elongate bar is threaded.

8. The apparatus of claim 3, wherein at least a portion of said form retainer portion is threaded.

9. The apparatus of claim 3, wherein said anchor portion comprises at least one of a wedge anchor; a sleeve anchor; a strike anchor; a drop-in anchor; as machine screw anchor; a leadwood screw anchor; a single expansion anchor; a double expansion anchor; a lag shield anchor; a hammer drive anchor; as split drive anchor, and a threaded screw anchor.

10. The apparatus of claim 9, wherein said aperture is shaped to receive a portion of at least one of a flat tie and at round tie.

* * * * *